United States Patent [19]

Buell

[11] Patent Number: 5,332,246
[45] Date of Patent: Jul. 26, 1994

[54] SINGLE SIDED CYCLE REAR SUSPENSION SYSTEM WITH VERTICAL WHEEL MOUNTING MEANS

[75] Inventor: Erik F. Buell, Mukwonago, Wis.

[73] Assignee: Buell Motor Company, Inc., East Troy, Wis.

[21] Appl. No.: 898,140

[22] Filed: Jun. 15, 1992

[51] Int. Cl.$^5$ ............................................. B62K 25/30
[52] U.S. Cl. .................................................. 280/284
[58] Field of Search ............... 280/275, 283, 284, 288, 280/281.1, 274, 287; 180/227

[56] References Cited

U.S. PATENT DOCUMENTS

| | | | |
|---|---|---|---|
| 3,917,313 | 11/1975 | Smith et al. | 280/284 |
| 4,058,181 | 11/1977 | Buell | 280/284 |
| 4,114,918 | 9/1978 | Lutz | 280/284 |
| 4,170,369 | 10/1979 | Strutman | 280/288 |
| 4,440,414 | 4/1984 | Wang | 280/287 |
| 4,463,824 | 8/1984 | Boyesen | 280/284 |
| 4,659,097 | 4/1987 | Küpper et al. | 280/288 |
| 4,712,638 | 12/1987 | Kawaguchi et al. | 280/275 |
| 4,723,620 | 2/1988 | Ono | 280/275 |
| 4,727,951 | 3/1988 | Morioka et al. | 280/275 |
| 4,789,174 | 12/1988 | Lawwill | 280/284 |
| 4,809,802 | 3/1989 | Seino et al. | 180/231 |
| 5,121,937 | 6/1992 | Lawwill | 280/284 |

*Primary Examiner*—Margaret A. Focarino
*Assistant Examiner*—Kevin Hurley
*Attorney, Agent, or Firm*—Ryan, Kees & Hohenfeldt

[57] ABSTRACT

A rear suspension system for a two wheel cycle, such as a bicycle or motorcycle, having a main frame which includes a mount for a steering apparatus to which the front wheel is mounted, and means for mounting a rear frame assembly which the rear wheel is mounted. The vertically pivotable rear frame assembly includes a single primary swingarm which extends rearwardly from a pivotal connection on the main frame, which pivot has an axis parallel to the rear wheel axis. The rear wheel is mounted to a primarily vertical junction member, which itself is attached by a second pivotal and parallel connection at the rear end of the main swingarm. A single secondary swingarm is also attached to the vertical junction member, by a third pivotal and parallel connection at some vertical distance below the second pivotal connection, and extends forwardly from the junction at an angle and spacing relative to the main swingarm. The secondary swingarm mounts to the main frame at some vertical distance below the main swingarm pivotal connection, via a fourth pivotal and parallel connection. Both arms pass along one side of the cycle only, with the rear wheel being mounted in a cantilever fashion from a real wheel mounting means attached to the vertical junction member which is also on the same one side.

12 Claims, 3 Drawing Sheets

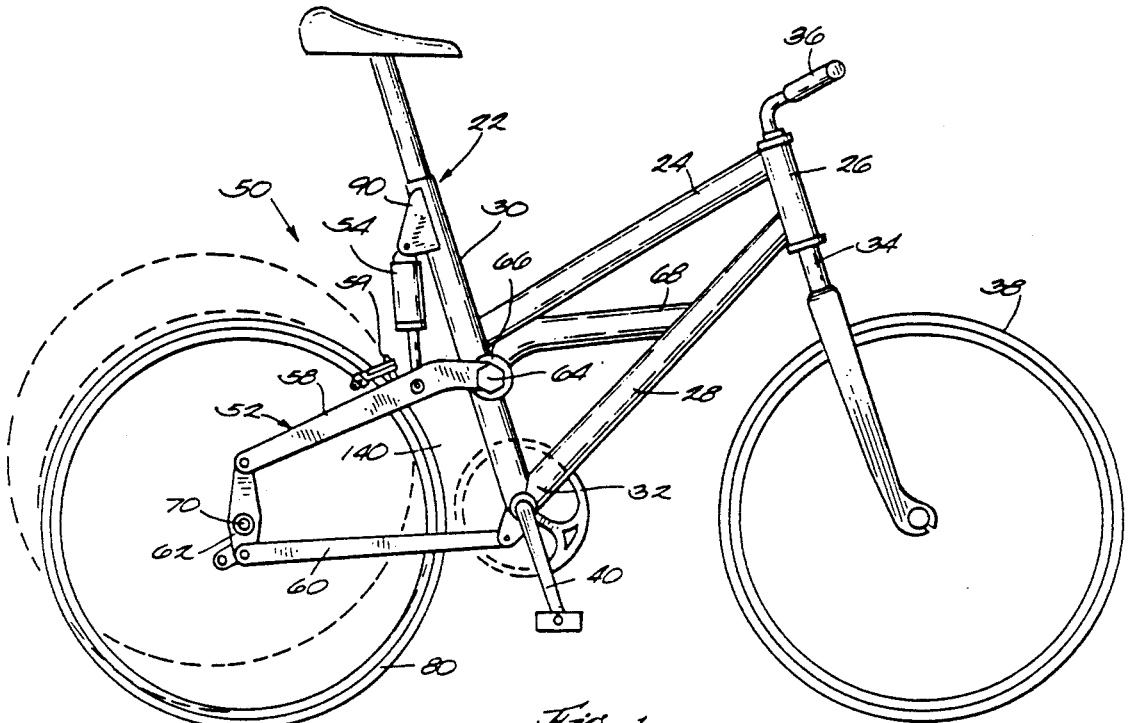

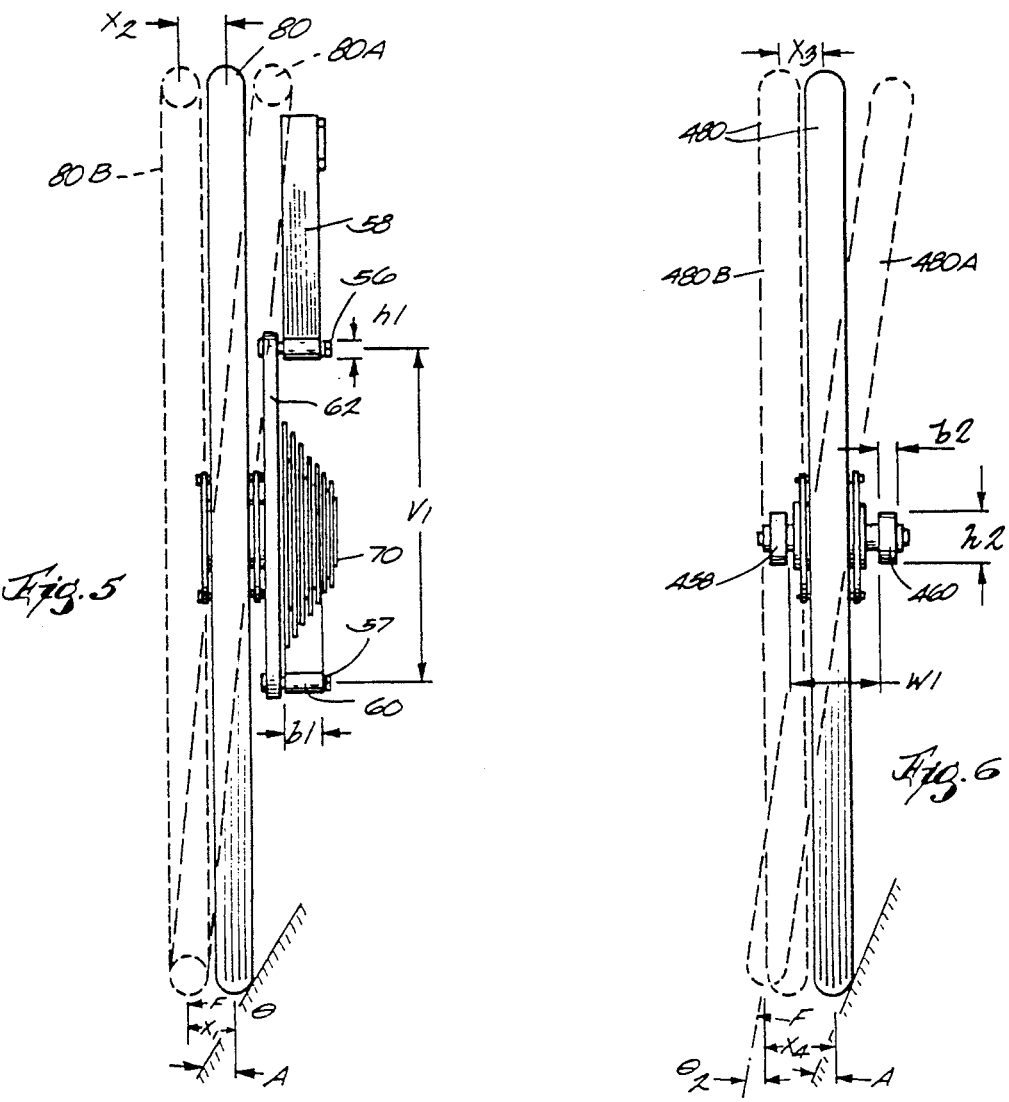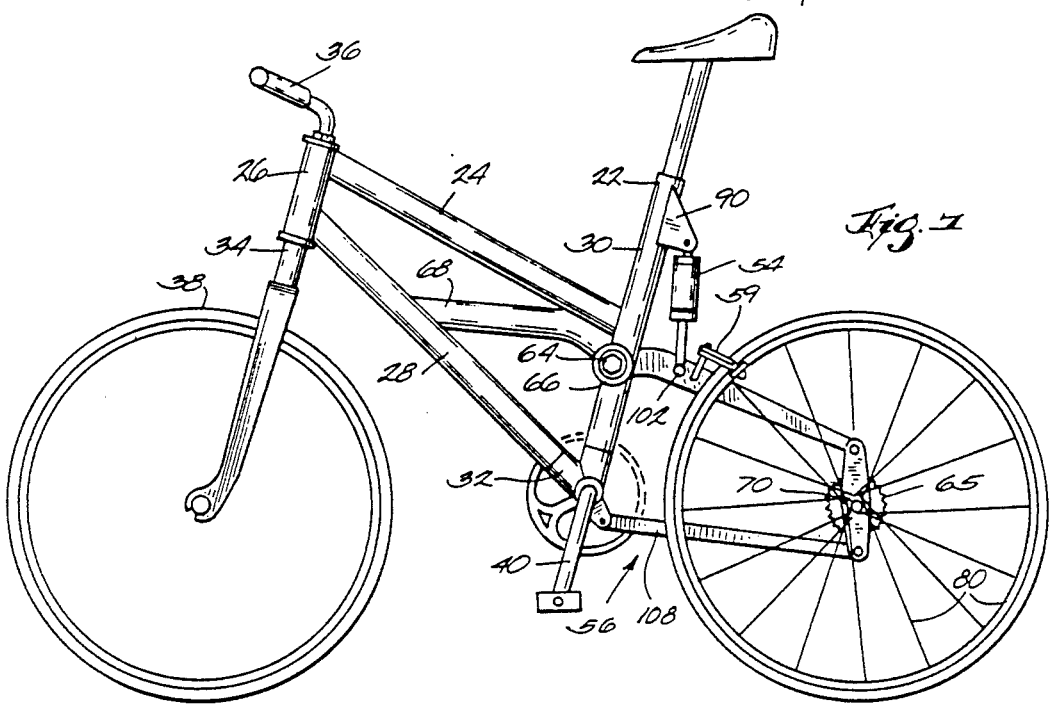

SINGLE SIDED CYCLE REAR SUSPENSION SYSTEM WITH VERTICAL WHEEL MOUNTING MEANS

BACKGROUND OF THE INVENTION

This invention relates to bicycle and motorcycle suspensions, and in particular to such suspensions which are connected from only one side rather than both sides as is more conventional.

Bicycles and motorcycles were originally built with rigid frames. As the horsepower, weight and speed of motorcycles increased, and they began to be used off road, both front and rear wheel suspensions were developed and have now reached a very high degree of sophistication. Many different arrangements have been used for springing and damping rear suspensions, including complex linkages. The majority of rear suspensions on two wheeled vehicles however, still use a fork-type rear swingarm as the main rear suspension structural member, no matter what type of springing, damping and linkages are used. The "fork" type swingarm has a member on each side of the rear wheel, these members are fixed together at the front pivot area, and are joined at the rear by a rear axle which clamps the wheel between the members. Changing the wheel, tire, brake, rotor, or wheel bearings requires removal of the rear axle from both members of the fork.

A few alternative designs, such as Buell, U.S. Pat. No. 4,058,181, invented by the present inventor, have used a pair of forked members one above the other, for a total of four essentially longitudinal members. Any removal of any of the wheel parts on such a system, though, still requires removal of the axle.

Automobiles of course employ cantilevered stub-axles which allow wheels, brakes, etc. to be removed easily. A few two-wheeled vehicles have used a single-sided swingarm, such as that shown in Seino, et al., U.S. Pat. No. 4,809,802. Generally such a single-sided swingarm has taken the form of a large section tubular member connected along one side of the wheel, the tubular member being attached at its front to the frame with a bearing set mounted on a single axis. Because the side loads on the wheel are transferred through this tubular member in torsion only, the member is large and heavy, yet provides only mediocre lateral and torsional rigidity. Since lateral and torsional rigidity are of paramount importance in two wheel vehicle chassis design, these earlier designs have met with little success.

This invention relates to improvements to the apparatus described above and to solutions to some of the problems raised or not solved thereby.

SUMMARY OF THE INVENTION

The invention is an improved rear wheel suspension system, especially beneficial on mountain bikes and performance motorcycles, but also useful on two wheel cycles generally, including street and highway bicycles, motorscooters, motorbikes and motorcycles. The system permits simple wheel, tire, and brake service, is lightweight, and provides high lateral and torsional chassis rigidity. It has similarities to the present inventor's co-pending single-sided application, but offers an alternate unique structure which would be useful in some specific applications.

Structurally, this design has a pivoting and translating rear frame assembly which has two vertically separated pivots about shafts mounted on the main frame. These shafts are transverse to the plane of the rear wheel, parallel to the rear wheel axle. The primary swingarm is a single beam joining the upper of these main frame pivot axes and a second parallel pivot axis on a vertical junction member to which is attached the rear wheel mounting means. A secondary swingarm or swingarm assembly reaches forward from a third pivotal attachment point which is also parallel to the rear wheel axle, to the second pivot on the main frame. This second main frame pivot axis is vertically below the primary swingarm main frame pivot axis, and is the fourth and last of the parallel axes.

Upward load on the rear tire causes the rear wheel/tire, its mounting means, and the vertical junction member to rotate and translate about the front pivot of the swingarms until such time as a spring device, which is activated by the upward wheel motion, is deflected sufficiently to absorb the load.

Sideways loads on the tire are prevented by this design from deflecting the wheel from its original plane. Lateral deflection is resisted by the horizontal sections of the two swingarms added together, and torsional deflection is resisted by the horizontal sections of the swingarms acting over the vertical spacing between their attachment points to the rear wheel mounting means. The vertical spacing between the locations of the mounting points on the frame reduces the loads on the frame and therefore reduces the deflection of the frame caused by the torque of a sideways tire load acting across the distance from tire contact patch to axle.

The system provided by the invention affords convenience in wheel and tire access, and also provides very high lateral and torsional rigidity in passing lateral loads from the rear tire contact patch to the main frame, due to the vertical spacing between the vertical junction member connections of the primary and secondary swingarms, and the similar vertical spacing between the frame connections of the primary and secondary swingarms. In one embodiment, elongated primary and secondary swingarms are pivotally attached to a primarily vertical junction member with an axle bearing set located vertically in between the primary and secondary swingarm pivot locations. The rear wheel is fixed to a cantilever axle which is inserted through the axle bearing set, and clamped to the bearing set inner races by a nut-like driven sprocket. Primary and secondary swingarms are both also pivotally attached to the main frame at separate vertically spaced locations. The action of this assembly during vertical movement of the rear wheel with respect to the frame is that of a four bar linkage.

Other objects and advantages will become apparent hereinafter.

BRIEF DESCRIPTION OF THE DRAWING

FIG. 1 is a right side elevational view of a bicycle incorporating a rear suspension system illustrating a preferred form of the present invention, in which view the rear suspension is in its extended, or unloaded, position.

FIG. 2 is a view similar to FIG. 1, showing the rear suspension system in a loaded, or impact absorbing position.

FIG. 5 is a rear view of a portion of the bicycle shown in FIG. 1.

FIG. 6 is a rear view of a portion of a bicycle constructed according to the prior art.

FIG. 7 is a left side elevational view of the bicycle shown in FIG. 1.

DESCRIPTION OF THE PREFERRED EMBODIMENT

Figure 3:
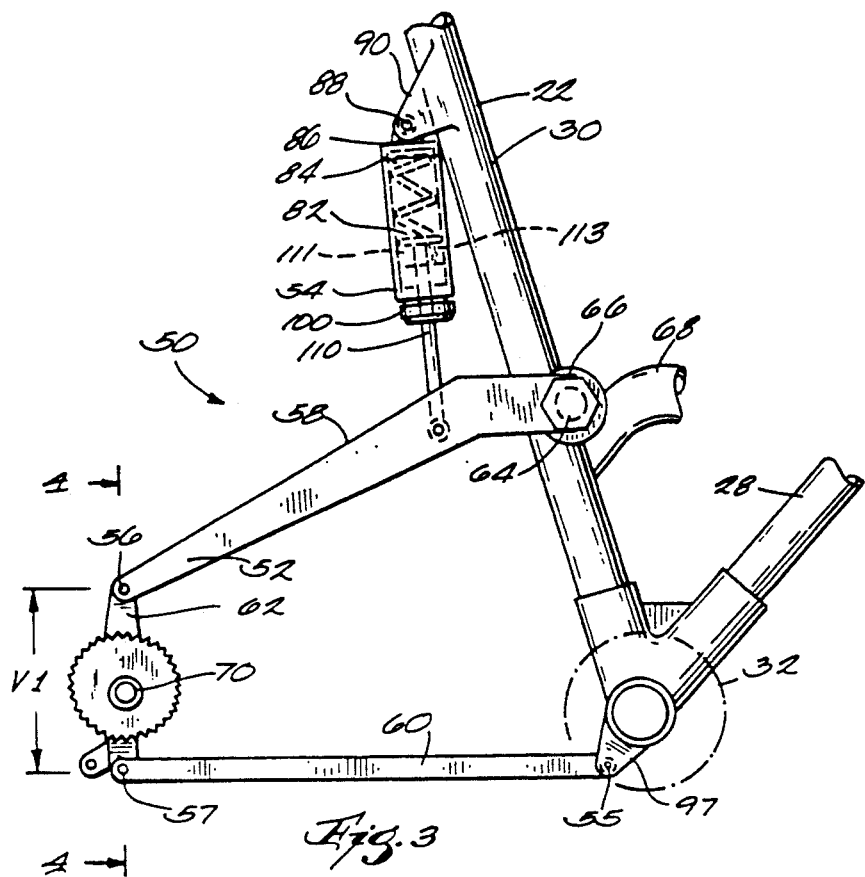
FIG. 3 is a fragmentary enlarged view of certain of the suspension elements shown in FIG. 1.

Referring now in more detail to the embodiment shown in FIGS. 1 through 5 and 7, a bicycle, generally designated 20, incorporates a preferred form of the present invention. The bicycle 20 has a main frame 22 including an inclined top tube 24, a head tube 26, a down tube 28, a seat tube 30, and a bottom bracket shell 32. Fitted to the main frame 22 are components which may be conventional and form no part of the invention, including a front fork 34, handlebar 36, front wheel 38, a pedal and front sprocket assembly 40, a rear sprocket assembly 65 (FIG. 7), and a rear brake assembly 59.

The rear suspension system 50 of this invention comprises a pivotal rear frame assembly 52 and a shock absorber/spring assembly 54. The rear frame assembly 52 includes a single primary swingarm 58, a single secondary swingarm 60, and a single rear junction 62.

As best shown in FIGS. 1, 2, 3 and 7, the rearwardly extending primary swingarm 58 is pivotally connected at its front end to the right side of the main frame 22. It is swingable in an arc about a pivot pin 64 extending through a bearing housing 66 which is secured to the seat tube 30 such as by welding. For strength, a triangulating reinforcement tube 68 is secured such as by welding between the seat tube 30 and down tube 28. The primary swingarm 58 has at its rear end a pivot pin 56 which pivots in a bore in the upper portion of rear Junction 62. Below pin 56 is located a rear axle 70, to which is journaled a rear wheel and tire assembly 80.

The tubular shock absorber/spring assembly 54 is mounted between the primary swingarm 58 and an upper portion of the seat tube 30. As shown in FIG. 3, this shock absorber assembly is substantially conventional, being formed of a cylindrical body 82 closed at the top end by an upper end cap 84 which has an upwardly directed axial extension 86 pivotally mounted on a pin 88 extending between a pair of brackets 90, 90 secured as by welding to the rear side of seat tube 30 adjacent its upper end. A lower cap 100 seals the bottom end of cylinder 82. A piston 111 with dampening apertures 113 to regulate the flow of liquid or gas through the piston is supported on a piston rod 110. Piston rod 110 is threadedly secured in lower mount 92, and extends upward therefrom, through a seal in lower cap 100. The fluid medium in the cylinder may be hydraulic or gas or a combination thereof, so as to dampen the movement of the piston 111 with respect to the cylinder 82. Lower mount 92 is attached to the primary swingarm 58 by a transverse pin 102. Of course the above-described orientation of the shock absorber/spring assembly 54 is preferred, although the reverse orientation would also function sufficiently well. A main spring 122 is provided internally to the cylinder 82. This spring is compressibly interposed between the upper end cap 84 and the piston 111 mounted concentrically to the cylindrical body 82.

As stated above, the invention calls for the pivotable rear frame assembly 52 to include a secondary swingarm 60. Swingarm 60 comprises a tube or beam, one end of which is secured by a pivot pin 57 which pivots in a bore in the lower portion of rear junction 62, below the rear axle 70. The opposite end of secondary swingarm 60 is connected to the main frame 22 by means of a fourth pivot pin 55. All four pivots, 55, 56, 57 and 64, have their axes substantially parallel with that of rear axle 70, and none permits any substantial motion other than rotation about its axis.

As best shown in FIGS. 3 and 5, the vertical spacing provided by rear Junction 62 between pivot pins 57 and 56 is designated V1. Increasing V1 increases the resistance provided by primary and secondary swingarms 58, 60 against torsional deflection to angle $\theta_1$, as can be seen in FIG. 5 by comparing deflected wheel/tire assembly 80A (shown in phantom) with wheel/tire assembly 80 in its undeflected position.

Through static analysis and physical testing, it is clear that the swingarms 58 and 60 act as cantilever beams to resist wheel deflection with respect to main frame 22. Cantilever beams resist deflection by means of the section provided by their moment of inertia I, the formula for which is $I = bh^3$ for beams of rectangular cross section.

The vertical section height h1 and the horizontal section width b1 of primary and secondary swingarms 58 and 60 are assumed to be the same for purposes of simplicity, although this is not required. Note that, in the invention, both lateral deflection $X_2$ (shown by deflected tire position 80B) and torsionally or angularly caused tire contact point movement $X_1$ (shown by deflected tire position 80A) of the rear wheel/tire assembly 80 caused by force F, are resisted mainly by the large horizontal section width b1, whereby the moment of inertia I is defined by $I = h1(b1)^3$. Total tire contact patch lateral deflection would equal $X_1$ plus $X_2$.

This advantage of the design is illustrated by comparison with the conventional forked swingarm design shown in FIG. 6. In the conventional design, left and right swingarms 458 and 460 are both assumed to have the same vertical section height and horizontal section width as each other, vertical section height h2 and horizontal section width b2. When an identical force F is applied to the contact point of wheel/tire assembly 480, it results in a deflected wheel position which is separated into its, two components, 480A being the deflected position from torsional or rotational movement by angle $\theta_2$ only, and 480B being the deflected position from lateral movement only. The tire patch deflection from torsion only is signified as $X_4$, while the additional deflection from lateral movement only is designated $X_3$. Total tire deflection would equal $X_3$ plus $X_4$. From this drawing it can be seen that the torsional deflection is resisted mainly by the taller vertical section h2 of the two swingarms 458 and 460 whereby the moment of inertia I is defined by $I = b2(h2)^3$, but that lateral deflection is resisted only by the narrow horizontal section of the swingarms 458 and 460 wherein the moment of inertia I becomes $I = h2(b2)^3$. With this conventional design, both vertical section h2 and horizontal section b2 must be increased to improve chassis parallelism rigidity. The horizontal spacing between swingarms 458 and 460 at the rear axle is herein called W1, and increasing W1 does improve the leverage swingarms 458 and 460 have to resist torsional deflection. However, the maximum width of W1 is limited by the increase it causes to vehicle width, and also by the limit it imposes on vehicle lean angle A, which on motorcycles can be as great as 55°.

Of even greater constraining importance is the width between the swingarms 458 and 460 at their forward ends, where they attach to the main frame. On a motorcycle, a width greater than 8 inches between the swingarms where they attach to the main frame typically causes packaging problems for the overall vehicle design. In bicycles, the present inventor's design work has shown that anything over 3 inches is a problem for the prior art.

By contrast, as best shown in FIGS. 1 and 5, the design provided by the present invention can have vertical spacing V1 near the axle equal nearly to the diameter of the wheel if the inside faces of swingarms 58 and 60 are kept close to the face of the tire, and spacing V2 of their attachment points on the main frame can be even greater. These spacings, can therefore be as great as 20 inches or more on current bicycle and motorcycle designs, although the present inventor's use of this design on prototypes has generally called for spacings of around 12 inches for V2 and 10 inches for V1.

Figure 4:
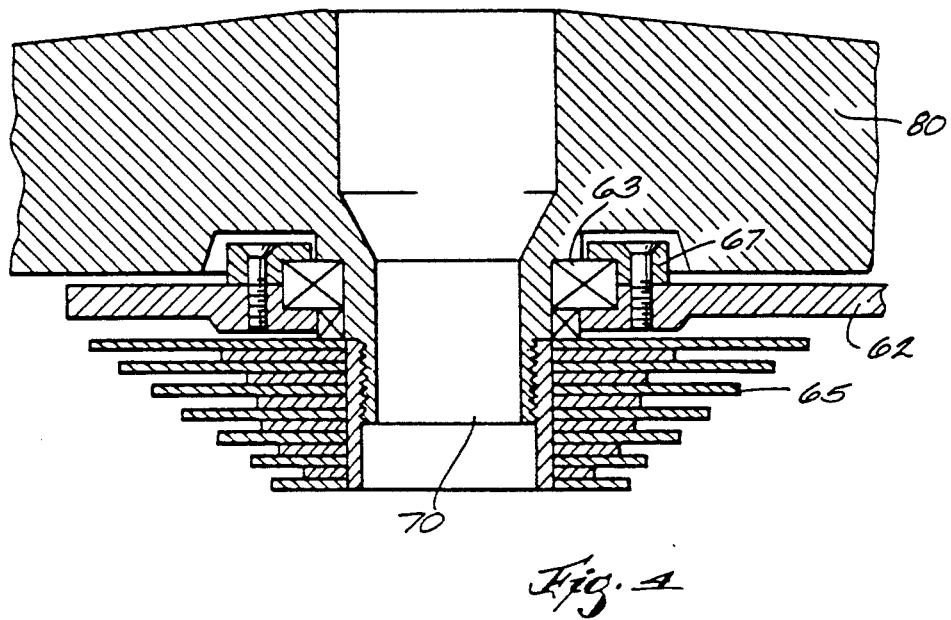
FIG. 4 is a fragmentary enlarged cross sectional view of the rear wheel and fitment, rear axle, rear sprocket set, and bearings, taken substantially along line 4—4 of FIG. 3.

As best shown in FIG. 4, the rear wheel and tire assembly 80 has an axle 70 fixed to said rear wheel assembly by welding, bonding, casting or the like. Axle 70 is inserted through the inner race of a bearing set 63, said bearing set 63 being fixed at its outer race by clamping of bearing retainer 67 to rear junction 62. A driven sprocket assembly 65 is attached to axle 70 by detachable means such as threads. Sprocket assembly 65 serves as a nut to retain axle 70, and thereby wheel assembly 80, to the inner race of bearing set 63. Wheel assembly 80, axle 70 and sprocket assembly 65 are thereby free to rotate together as an assembly about the axis of axle 70 but are fixed to rear junction 62 in all other directions.

While particular examples of the present invention have been shown and described, changes and modifications may be made without departing from the basic invention. Accordingly, the aim of the appended claims is to cover all such changes and modifications which are included within the spirit and scope of the invention.

I claim:

1. A single-sided rear suspension system for a cycle having a main frame and a rear wheel, said suspension system comprising:
   a pivotable rear frame assembly including:
      a single primary swingarm pivotally connected at its front end on a first axis to the main frame, extending along one side only of said rear wheel,
      a junction member pivotally connected on a second axis to the rear end of said primary swingarm,
      said junction member having means for fitment of said rear wheel from said one side only,
      said swingarm junction member and wheel fitment means pivoting to allow for up and down movement of said rear wheel relative to the main frame, and
      a single secondary swingarm having one end pivotally connected to said junction member on a third substantially parallel axis spaced below said second axis, said secondary swingarm extending forward along said one side only of said rear wheel, and being attached by a fourth parallel axis to a pivot connection at the main frame, spaced below said first axis connection; and
   biasing means mounted at one end to a portion of the main frame and connected at the opposite end to the pivotable rear frame assembly.

2. A single-sided rear suspension system according to claim 1 further comprising an axle which rotates in a bearing mounted to said junction member, said axle protruding out both sides of said bearing, having said rear wheel mounted on one side of said axle and a drive socket mounted on the opposite side.

3. A single-sided rear suspension system according to claim 1 wherein said biasing means includes dampening means for dampening the movement of the pivotable rear frame assembly with respect to the main frame.

4. A single-sided rear suspension system according to claim 1 further comprising dampening means for dampening the movement of the pivotable rear frame assembly with respect to the main frame.

5. A single-sided rear suspension system according to claim 1 wherein said junction member is oriented substantially vertically, such that said third axis is substantially vertically spaced beneath said second axis.

6. A single-sided rear suspension system for a cycle having a main frame, said suspension system comprising:
   a pivotable rear frame assembly including a primary swingarm pivotally connected at its front end on a first singular axis to the main frame, passing by one side of a rear wheel, said rear wheel having a rear wheel contact patch by which said rear wheel contacts the ground, said primary swingarm being pivotally connected on a second parallel axis at its rear end to a vertical junction member, said junction member having means for fitment of said rear wheel from said one side only, said swingarm junction member and wheel fitment menas pivoting to allow for up and down movement of said rear wheel relative to the main frame, said rear frame assembly also including a forwardly extending secondary swingarm having one end thereof pivotally connected to said junction member on a third parallel axis separated vertically in a location below said second axis, said secondary swingarm extending forward along said one side only of said rear wheel, and attaching by a fourth parallel axis to a pivot connection at the main frame, vertically separated below said first axis connection,
   a spring supported on one end of a portion of the frame and connected at the primary swingarm, said spring urging said pivotable rear frame assembly toward an unloaded position with respect to said frame;
   whereby lateral load to the rear wheel contact patch is resisted from torsionally or laterally deflecting the pivotable rear frame assembly with respect to the main frame by the rigidity of the four axes, which allow only rotation required to allow said rear wheel to move essentially vertically with respect to said frame for compliance over surface irregularities, said axes having no lateral freedom of motion.

7. A single-sided rear suspension system according to claim 6 in which the rear wheel mounting means includes an axle which rotates on a bearing or bearing set mounted in a junction means to which primary and secondary swingarms attach, said axle protruding out both sides of said bearing, having said rear wheel mounted on one side of said axle and a drive sprocket mounted on the opposite side.

8. A single-sided rear suspension system for a cycle having a main frame and a rear wheel, said suspension system comprising:

a pivotable rear frame assembly including:

a single primary swingarm pivotally connected at its front end on a first axis to the main frame, extending along one side only of said rear wheel, a junction member pivotally connected on a second axis to the rear end of said primary swingarm, said junction member having means for fitment of said rear wheel from said one side only, said swingarm junction member and wheel fitment means pivoting to allow for up and down movement of said rear wheel relative to the main frame, and a single secondary swingarm having one end pivotally connected to said junction member on a third substantially parallel axis spaced below said second axis, said secondary swingarm extending forward along said one side only of said rear wheel, and being attached by a fourth parallel axis to a pivot connection at the main frame, spaced below said first axis connection; and biasing means mounted at one end to a portion of the main frame and connected at the opposite end to said primary swingarm.

9. A single-sided rear suspension system according to claim 8 further comprising an axle which rotates in a bearing mounted to said junction member, said axle protruding out both sides of said bearing, having said rear wheel mounted on one side of said axle and a drive sprocket mounted on the opposite side.

10. A single-sided rear suspension system according to claim 9 wherein said biasing means includes dampening means for dampening the movement of the pivotable rear frame assembly with respect to the main frame.

11. A single-sided rear suspension system according to claim 9 further comprising dampening means for dampening the movement of the pivotable rear frame assembly with respect to the main frame.

12. A single-sided rear suspension system according to claim 9 wherein said junction member is oriented substantially vertically, such that said third axis is substantially vertically spaced beneath said second axis.

\* \* \* \* \*